United States Patent
Rosado et al.

(10) Patent No.: US 11,482,854 B2
(45) Date of Patent: Oct. 25, 2022

(54) DIRECT CURRENT (DC) CIRCUIT BREAKER

(71) Applicant: Hamilton Sundstrand Corporation, Charlotte, NC (US)

(72) Inventors: Sebastian Rosado, Cork (IE); Chi Zhang, Cork (IE); Adam Whitford, Cork (IE)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/339,568

(22) Filed: Jun. 4, 2021

(65) Prior Publication Data
US 2021/0384718 A1 Dec. 9, 2021

(30) Foreign Application Priority Data
Jun. 5, 2020 (EP) .................................. 20275103

(51) Int. Cl.
| | | |
|---|---|---|
| *H02H 3/42* | (2006.01) | |
| *H02H 3/087* | (2006.01) | |
| *H02H 3/44* | (2006.01) | |
| *H02H 7/26* | (2006.01) | |
| *H01H 9/54* | (2006.01) | |

(52) U.S. Cl.
CPC ............. *H02H 3/42* (2013.01); *H02H 3/087* (2013.01); *H02H 3/445* (2013.01); *H02H 7/268* (2013.01); *H01H 2009/544* (2013.01)

(58) Field of Classification Search
CPC .......... H02H 3/087; H02H 3/093; H02H 3/08; H02H 3/202; H02H 3/16; H02H 3/33; H02H 9/02; H01H 33/596; H01H 33/59; H02J 3/36; G01R 31/085
See application file for complete search history.

(56) References Cited

U.S. PATENT DOCUMENTS

| | | | |
|---|---|---|---|
| 4,740,858 | A  | 4/1988 | Yamaguchi et al. |
| 9,065,326 | B2 | 6/2015 | Hafner et al. |
| 9,450,397 | B2 | 9/2016 | Johansson |
| 10,176,939 | B2 | 1/2019 | Park et al. |
| 10,389,104 | B1 | 8/2019 | Corzine |

(Continued)

FOREIGN PATENT DOCUMENTS

| | | |
|---|---|---|
| CN | 104242229 A | 12/2014 |
| KR | 20170142020 A | 12/2017 |

(Continued)

OTHER PUBLICATIONS

Abstract of CN104242229A, 1 page.

(Continued)

*Primary Examiner* — Bryan R Perez
(74) *Attorney, Agent, or Firm* — Cantor Colburn LLP (57) ABSTRACT

There is disclosed a circuit breaker arrangement for interrupting a current flowing through a direct current (DC) transmission line including a semiconductor switching device and a pulse injection circuit configured to inductively inject into the transmission line a pulse current that opposes the current flowing through the transmission line to thereby reduce the current in the transmission line to cause the semiconductor switching device to turn-off to interrupt the path for the current flow through the transmission line.

12 Claims, 4 Drawing Sheets

(56) References Cited

U.S. PATENT DOCUMENTS

| | | | |
|---|---|---|---|
| 10,389,230 B2 | 8/2019 | Mao et al. | |
| 2018/0138689 A1* | 5/2018 | Wu | H01H 9/542 |
| 2018/0174784 A1 | 6/2018 | Kim | |

FOREIGN PATENT DOCUMENTS

| | | | |
|---|---|---|---|
| WO | 2016096016 A1 | 6/2016 | |
| WO | 2019234401 A1 | 12/2019 | |

OTHER PUBLICATIONS

Abstract of KR20170142020, 1 page.
Extended European Search Report for International Application No. 20275103.8 dated Nov. 25, 2020, 8 pages.

* cited by examiner

DIRECT CURRENT (DC) CIRCUIT BREAKER

CROSS-REFERENCE TO RELATED APPLICATIONS

This application claims priority to European Patent Application No. 20275103.8 filed Jun. 5, 2020, the entire contents of which is incorporated herein by reference.

TECHNICAL FIELD

The technology disclosed herein relates to circuit breakers, and in particular to a circuit breaker arrangement for use with direct current (DC) transmission lines.

BACKGROUND

It is increasingly common for aircraft propulsion systems to include electrical components, with there being a desire to move towards full electrical propulsion systems. A typical modern aircraft will of course also include various other electronic systems used for communication, navigation, etc., purposes (which systems are often referred to as "avionic" systems).

In order to meet aviation safety requirements it is necessary to provide electrical protection to the electrical distribution systems within an aircraft, e.g., to protect the various electrical/electronic components from excess voltage and current due to overloading or short circuit conditions. To provide the desired electrical protection it may therefore be desired to include a circuit breaker component within the electrical distribution system.

Electrical distribution systems on-board aircraft typically use direct current (DC) transmission to provide power to the various components within the electrical distribution network of the aircraft. However, the Applicants have recognised that some existing DC circuit breaker arrangements may not be well suited for applications on-board aircraft.

For instance, traditional DC circuit breakers are electro-mechanical devices but the relatively higher voltage levels that may be desired for meeting the power density requirements for aircraft propulsion systems can increase the risk of arcing across the terminals of the circuit breaker device. Electro-mechanical circuit breakers are also limited in terms of their size, weight and response time. The risk of arcing may be partly addressed with mechanical quenching but this may undesirably increase the size and weight of the system, and would not address the slow response time.

The Applicants therefore believe that there remains scope for improved circuit breaking arrangements for interrupting a current flowing through a DC transmission line, especially for use in aircraft electrical distribution systems.

SUMMARY

An embodiment of the present disclosure provides a circuit breaker arrangement for interrupting a current flowing through a direct current (DC) transmission line, the circuit breaker arrangement comprising:

a semiconductor switching device arranged to turn-off to interrupt the current flowing through the transmission line when the current in the transmission line falls below a threshold value determined by the semiconductor switching device;

a pulse injection circuit including pulse generating circuitry operable to generate a pulse current and an inductive coupling between the pulse generating circuitry and the transmission line arranged to inductively inject pulse currents generated by the pulse generating circuitry into the transmission line;

a current sensor for monitoring the current in the transmission line; and a control circuit that is configured to, in response to receiving a signal to interrupt the current flowing through the transmission line cause the pulse injection circuit to inductively inject into the transmission line a pulse current that opposes the current flowing through the transmission line to thereby reduce the current in the transmission line below the threshold value determined by the semiconductor switching device to cause the semiconductor switching device to turn-off to interrupt the path for the current flow through the transmission line.

The overall operation of the circuit breaker arrangement is thus controlled by an appropriate control circuit (or controller) that is configured to control the delivery of the pulse current injection, to thereby control the state of the semiconductor switching device.

Thus, when it is desired to interrupt the current flowing through the transmission line, a suitable control signal is sent to the control circuit to control the circuit breaker arrangement to do this.

For example, and in an embodiment, the signal to interrupt the current may be generated in response to the current sensor detecting an overcurrent in the transmission line. In that case, the current sensor may signal this to the control circuit to cause the control circuit to interrupt the current flowing through the transmission line.

However, it will be appreciated that there may be other situations where it is desired interrupt the current flowing through the transmission line. For instance, in another embodiment, the signal to interrupt the current flowing through the transmission line may correspond to an operation request from a master controller of the system in which the circuit breaker is provided. For example, the signal may be provided from an overall (main) controller for an electrical distribution system (e.g. of an aircraft) within which the circuit breaker arrangement is provided.

In an embodiment, when it is desired to interrupt the current flowing through the transmission line, the control circuit is configured to control the pulse generating circuitry to generate a pulse current having a size determined based on the size of the current monitored by the current sensor.

For instance, the pulse generating circuitry may comprise one or more charge storage devices. The charge storage devices may, e.g., comprise capacitors, or capacitor banks. The size of the pulse current may then be controlled by selectively discharging the one or more charge storage devices.

For example, in embodiments the pulse generating circuitry may comprise a plurality of charge storage devices, and the size of the pulse current may be controlled by selectively discharging a set or subset of the plurality of charge storage devices. Thus, a larger pulse current may be injected by discharging a greater number of charge storage devices.

However, other arrangements would be possible for controlling the size of the pulse current. For instance, as another example, the pulse generating circuitry may be arranged to control a duration of the discharge of the charge storage devices.

The inductive coupling may comprise a transformer having a first winding connected to the transmission line and a second winding connected to the pulse generating circuitry.

The first winding may be connected in series with the transmission line (and may comprise the primary winding of the transformer). In an embodiment the second winding i.e. the winding that is connected to the pulse generating circuitry (which may comprise the secondary winding of the transformer) may include a greater number of turns than the first winding. However, in general the turn ratio can be selected as desired depending on the configuration.

The semiconductor switching device may comprise a bipolar transistor such as a gate turn-off transistor, or a silicon-controlled rectifier.

The current sensor may, for example, comprise a Hall effect sensor.

However, other arrangements for the semiconductor switching device and/or current sensor would be possible.

In an embodiment, the circuit breaker arrangement may comprise a "snubber" circuit for reducing overvoltage when the pulse current is injected. For example, the snubber circuit may comprise a diode connected in series to an resistor-capacitor circuit altogether connected in parallel with the first winding of the transformer. However, other arrangements would be possible.

The circuit breaker arrangement may be provided within a transmission line as part of an overall electrical distribution system. Thus, in embodiments, there is provided an electrical distribution system including a direct current (DC) power supply and a transmission line for distributing power from the DC power supply to one or more electrical and/or electronic components, wherein the transmission line includes a circuit breaker arrangement substantially as described above.

Another embodiment of the present disclosure provides a method of interrupting a current flowing through a direct current (DC) transmission line using a circuit breaker arrangement substantially as described above, the method comprising: when it is desired to interrupt the current flowing through the transmission line: the control circuit controlling the pulse injection circuit to inject a pulse current into the transmission line opposing the current flowing through the transmission line to thereby reduce the current in the transmission line below the threshold value determined by the semiconductor switching device such that the semiconductor switching device interrupts the current flowing through the transmission line.

The method may further comprise monitoring the current in the transmission line. When it is desired to interrupt the current flowing through the transmission line the method may comprise the control circuit controlling the pulse generating circuitry to generate a pulse current having a magnitude determined based on the size of the current monitored by the current sensor. Thus, the control circuit may be configured to control the pulse injection circuit to inject a pulse current into the transmission line in response to a signal received from the current sensor, e.g., indicating that there is an overcurrent in the transmission line.

Alternatively/additionally, the control circuit may be configured to control the pulse injection circuit to inject a pulse current into the transmission line in response to a signal received from a master controller for the overall power distribution system within which the circuit breaker arrangement is provided.

Various other arrangements would be possible in this regard and in general the signal to interrupt current through the transmission line may be generated in any suitable and desired manner.

A number of embodiments will now be described by way of example only, with reference to the drawings. The described embodiments are by way of example only. The scope of this disclosure is limited only by the claims.

DETAILED DESCRIPTION

The present disclosure generally relates to a circuit breaker arrangement. In particular, the present disclosure provides a circuit breaker arrangement for interrupting a current through a direct current (DC) transmission line using a semiconductor switching device and a pulse current, in a manner that will be explained below.

For the avoidance of doubt, it will be understood that a "circuit breaker" is an electrical switch that is designed to automatically—i.e. without user intervention—interrupt a current flow through a transmission line within a circuit (to 'break' the circuit), e.g., in response to the detection of a fault leading to the current flow through the transmission line exceeding a certain limit (e.g. due to a current overload or a short circuit). A circuit breaker is thus designed to protect an electrical circuit from damage that may be caused by an excess current.

Figure 1:
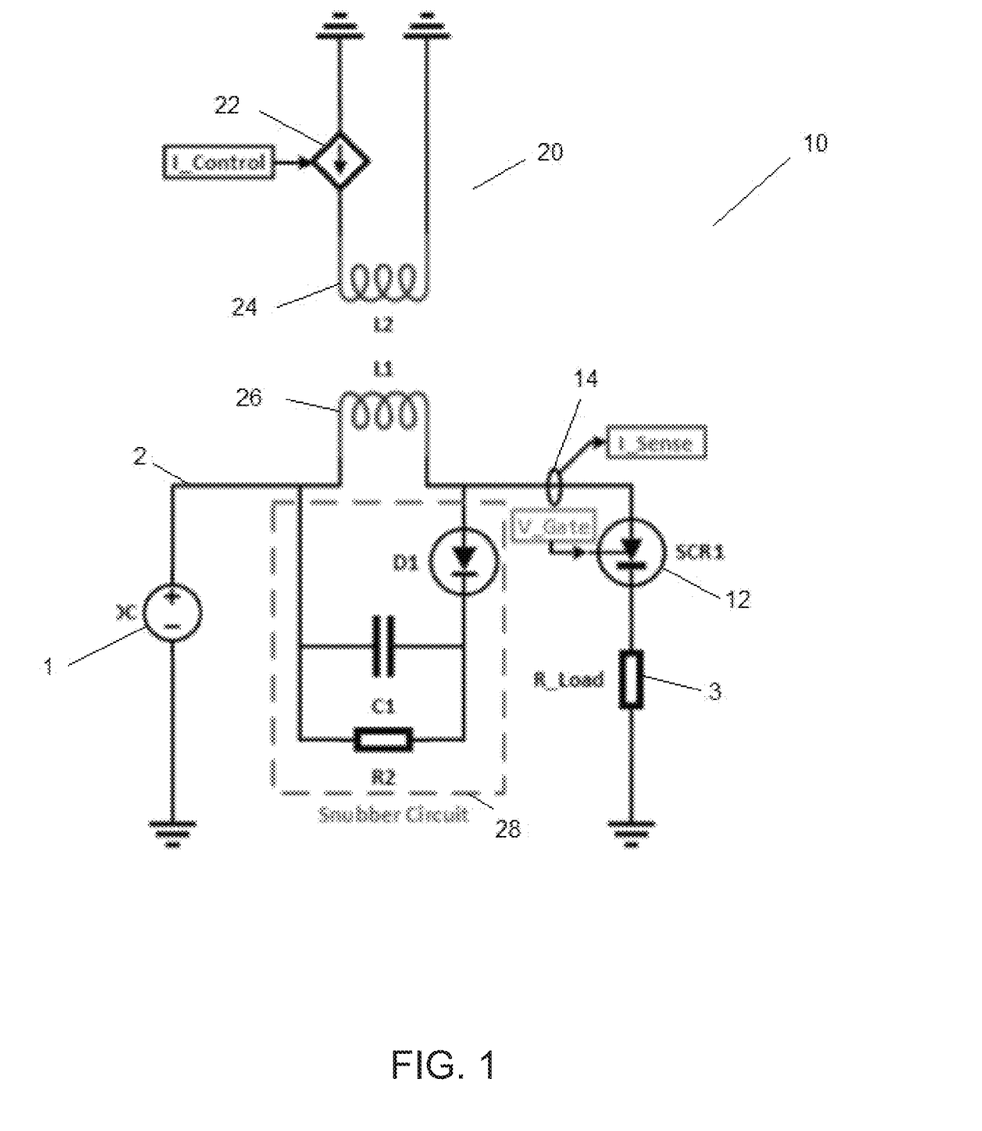
FIG. 1 shows an example of a DC circuit breaker arrangement according to an embodiment of the present disclosure.

FIG. 1 shows an example of a DC circuit breaker arrangement according to an embodiment of the present disclosure.

As shown in FIG. 1, the circuit breaker arrangement 10 according to the present disclosure comprises a semiconductor switching device 12, which may also be referred to herein as a 'power electronic device', that is operable to interrupt the current flow through a transmission line 2. For example, as shown in FIG. 1, the semiconductor switching device 12 is connected in series with the transmission line 2 and is arranged to switch off when the current flowing through it drops below a certain threshold value associated with the semiconductor switching device 12 (which threshold value will generally be determined by the type and configuration of the semiconductor switching device 12, in a known manner).

In normal operating conditions, the semiconductor switching device 12 is therefore closed such that the required operating current is able to flow from a DC power supply 1 through the semiconductor switching device 12 of the circuit breaker arrangement 10 in the transmission line 2 to provide an output load 3, which may, e.g., be provided to one or more electrical/electronic components.

The circuit breaker arrangement 10 includes a current sensor 14 that monitors the current flowing through the transmission line 2. When the current sensor 14 detects an overcurrent in the transmission line 2 the circuit breaker arrangement 10 is then caused to switch off the semiconductor switching device 12 to interrupt the current flow (and to 'break' the circuit), in the manner described below.

To do this, a pulse injection circuit 20 is provided that comprises pulse generating circuitry 22 that is operable to generate a pulse current, which pulse current is then injected onto the transmission line 2 through an inductive coupling in the form of a transformer having a first winding 26, which in the present embodiment defines the primary winding of the transformer, connected in series with the transmission line and a second winding 24, which in the present embodiment defines the secondary winding of the transformer, connected to the pulse generating circuitry 22.

Thus, when the current sensor 14 detects an overcurrent, a signal indicating this is provided to a controller for the circuit breaker arrangement 10. The controller then controls the pulse generating circuitry 22 of the pulse injection circuit 20 to generate a pulse current that opposes the overcurrent in the transmission line 2. The injection of the generated pulse current through the inductive coupling into the transmission line 2 therefore instantaneously reduces, or in some cases reverses, the current flowing in the transmission line 2, which in turn enables the semiconductor switching device 12 to switch off to interrupt the transmission line 2 under low current conditions.

For instance, in embodiments, the control circuit controls the pulse generating circuitry 22 to generate an pulse current such that the size of the injected pulse current matches, or substantially matches, the size of the current in the transmission line 2, but flows in the opposite direction, such that the total current in the transmission line 2 is instantaneously reduced substantially to zero (or in some cases less than zero).

In this way, the current can be controllably, instantaneously reduced to a sufficient level below the threshold determined by the semiconductor switching device 12 when it is desired to interrupt the current in the transmission line 2.

Using a semiconductor switching device 12 to interrupt the transmission line can potentially provide faster response times than traditional electro-mechanical circuit breakers. Furthermore, modern semiconductor switching devices have shown promising current handling capabilities for use, e.g., in aircraft electrical distribution systems. Because the current level flowing through the transmission line 2 is instantaneously reduced when the opposing pulse current is injected onto the transmission line 2, the above circuit breaker arrangement thus facilitates the use of such semiconductor switching devices as the circuit breaking component, which may also help reduce the physical size of the circuit breaker arrangement.

Thus, the above arrangement may provide a circuit breaking arrangement 10 that is relatively light weight, and with reduced potential for arcing, at least compared to more traditional electromechanical circuit breakers, and that is therefore particularly suitable for use in aircraft electrical/electronic systems. Of course, the circuit breaking arrangement described above may also find utility in any other suitable applications where it is desired to effectively interrupt current flowing in a DC transmission line, and desirably using a light weight circuit breaking arrangement, and the above arrangement is not limited for use in aircraft systems.

Further, it will be appreciated that the pulse generating circuitry 22 in the above arrangement is substantially isolated from the transmission line 2 via the inductive coupler during normal operation conditions (e.g. when the current is within the desired operating range). This also facilitates a more independent control of the pulse generating circuitry 22 which can thus be controlled to inject a pulse current having any desired form. This may therefore facilitate a more efficient and flexible operation for the circuit breaker arrangement 10.

The various components of the circuit breaker arrangement of FIG. 1 will now be described in turn. Of course, this description of the components is non-limiting and the circuit breaker arrangement according to the present disclosure may include further components not discussed below. Similarly, the components described below may be modified, or in some cases omitted, whilst still falling within the scope of the present disclosure as defined by the appended claims.

Power Semiconductor Switch—12

As explained above, the circuit breaker arrangement of the present disclosure facilitates the use of semiconductor switching devices 12 (e.g., rather than traditional electro-mechanical circuit breaking arrangements, which can be relatively bulky and may not be well suited for higher voltage applications). In this respect, the present disclosure has recognised that modern available semiconductor switching devices, particularly bipolar devices such as silicon-controlled rectifiers ("SCR") or gate-turn off transistors ("GTO") are able to provide relatively large surge current capacity for use in such applications.

In the circuit breaker arrangement of the present disclosure the semiconductor switching device 12 is arranged to switch off, and to interrupt the circuit, when the current in the transmission line 2 is near (or less than) zero. The semiconductor switching device 12 (or 'switch') may thus comprise any suitable semiconductor device, e.g. a transistor, thyristor, etc., that is operable to interrupt a current flow through a transmission line when the current in the transmission line falls below a threshold value.

For instance, as mentioned above, the semiconductor switching device 12 may be provided in the form of an SCR device. In that case, the SCR may be caused to switch off when the current drops below zero (and the pulse current should therefore be generated accordingly). In another example, the semiconductor switching device 12 may be provided in the form of GTO that is caused to switch off when the current drops below a certain (non-zero) threshold. Other examples of suitable semiconductor switching devices for use with the present disclosure might include any of an insulated-gate bipolar transistor ("IGBT"), an integrated gate-communicated thyristor ("IGCT"), an emitter turn-off thyristor ("ETO"), etc. However, other types of semiconductor switching device may be used, e.g. provided that they have sufficient current handling capacity for use in the desired application.

The semiconductor switch may additionally have some overvoltage protection to its terminals, e.g. snubber, varistor, or other circuit, intended to limit voltage rise that may occur when current is interrupted. The type and characteristic of the overvoltage protection depends on the type of semiconductor switch utilized.

The state of the semiconductor switching device 12 is generally controlled by the gate voltage, as will be described below.

In embodiments, and as shown in FIG. 1, there may be (only) a single semiconductor switch. In this way the physical size of the circuit breaker arrangement 10 can be reduced. However, it would also be possible to use multiple semiconductor switching devices connected either in parallel or series, as desired. This may help increase the current handling capability of the semiconductor switching devices (but may lead to problems with voltage balancing).

Controller —30

The control of this system is done by monitoring the current flowing in the transmission line using the current sensor 14. By way of example, in an embodiment, the current sensor comprises a Hall effect sensor. This type of sensor has been found to have a suitably high bandwidth to detect sudden changes in current with respect to time (i.e. high rate of change of current with respect to time conditions) However, any suitable and desired type of current sensor may be used for this purpose, e.g. so long as the current sensor can provide a sufficiently rapid response to control the circuit breaker arrangement.

In an embodiment, the current sensor 14 measures the current flow, and returns the measured value to a controller (or 'control circuit') 30 for the circuit breaker arrangement 10. However, it would also be possible for the current sensor 14 to simply compare the current flow with a predetermined threshold and return a signal indicating, e.g., that the current exceeds the threshold value (without indicating the actual value).

The controller 30 may, for example, comprise a processor such as a suitable microprocessor (microcontroller), or a field-programmable gate array ("FPGA"), etc. In response to receiving a signal from the current sensor 14 indicating that the current should be interrupted, the controller 30 then controls the circuit breaker arrangement 10 to operate in the manner described above.

In particular, the controller 30 is in communication with the independent pulse generating circuitry 22 of the pulse injection circuit 20. Thus, in response to receiving a signal from the current sensor indicating that the current should be interrupted (which may be determined by the current sensor 14 itself, or by the controller 30 based on the signal from the current sensor), the controller 30 then controls the pulse generating circuitry 22 to generate a suitable pulse current opposing the current flowing in the transmission line. Alternatively/additionally the signal indicating that the current should be interrupted may be provided by a system level electrical distribution controller. The generated pulse current is then injected by the pulse injection circuit 20 onto the transmission line.

Thus, in embodiments, when it is desired to operate the circuit breaker arrangement 10, the controller 30 determines based on the signal received from the current sensor 14 a value for the current flowing in the transmission line, and then sends a corresponding signal to the pulse generating circuitry 22 to generate a pulse current substantially matching, or exceeding, this value. For instance, the size of the pulse current may be controlled to match, or substantially match, the current flowing in the transmission line but in the opposite direction so the sum of the currents flowing is close to zero (or less than zero, e.g., for an SCR device).

Figure 2:
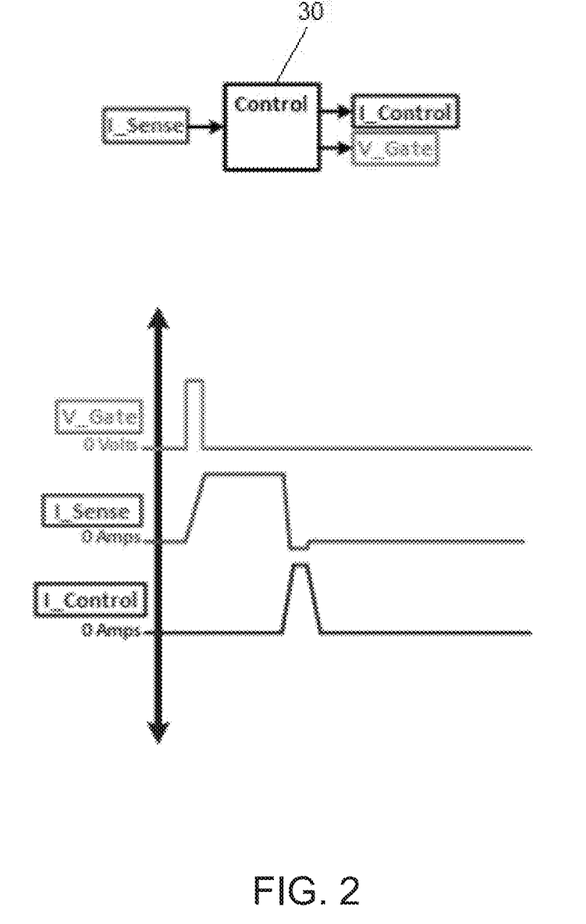
FIG. 2 illustrates the control scheme for the DC circuit breaker arrangement of FIG. 1.

FIG. 2 illustrates this control operation. As shown in FIG. 2, the monitored current from the current sensor 14 ('I_Sense') is input to the controller 30 that then determines an appropriate control signal ('I_Control') for the pulse generating circuitry 22 and gate voltage ('V_Gate') for the semiconductor switching device 12.

For instance, as mentioned above, the state of the semiconductor switching device 12 is controlled by the gate voltage ('V_Gate') that is applied to the semiconductor switching device 12. In the case of an SCR-based semiconductor switching device 12, the semiconductor switching device 12 may only need an initial pulse on the gate to start conducting. This is illustrated in the plots shown in FIG. 2. Once the semiconductor switching device 12 starts conducting, the current then starts flowing in the transmission line 2. For an SCR-based semiconductor switching device 12 the gate cannot turn off the device as long as there is positive current flowing through it. Thus, in this example, when it is desired to break the circuit, the controller 30 causes a pulse current to be injected such that the sensed current instantaneously drops below zero. This causes the semiconductor switching device 12 to switch off and the current is thus interrupted. For other types of semiconductor switching device 12 the device may be turned off under low current conditions. In that case, it is not necessary to reverse the current when it is desired to break the circuit, and the controller 30 need only cause a pulse current to be injected such that the sensed current instantaneously drops to (or close to) zero.

This also means semiconductor switching device 12 needs a significantly lower current interruption rating to break the circuit.

It will be appreciated that this pulse injection is controlled by overall controller (control circuit) for circuit breaker based on the received signals from the current sensor and a signal from the system level power distribution controller (e.g. rather than being self-limiting).

For instance, control circuit operable to receive signal from current sensor, and then cause pulse injection circuit to inject pulse in a controlled manner, e.g., with the magnitude of the injected pulse being determined and controlled based on the signal received from the current sensor.

Pulse Generating Circuitry 22

The pulse injection circuit 20 thus comprises pulse generating circuitry 22 that is operable to generate such pulses.

Figure 3:
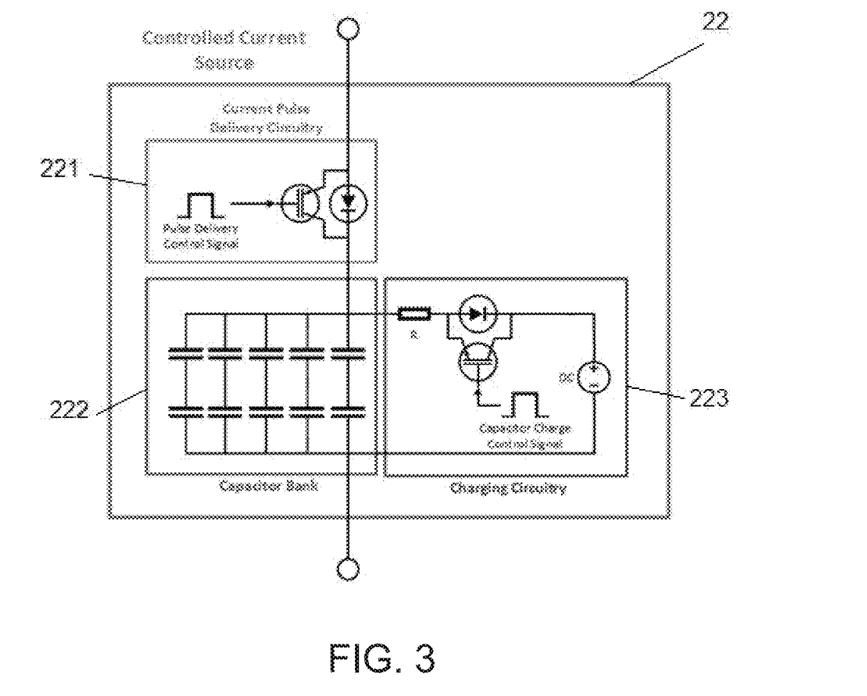
FIG. 3 shows an example of a pulse injection circuit that may be used within a DC circuit breaker arrangement according to the present disclosure.

Since the pulse current will need to large and for a short duration, in embodiments, a capacitor discharge is used to generate the pulse, as illustrated in FIG. 3. The pulse generating circuitry in FIG. 3 comprises the following items:

Pulse current delivery circuit 221—This circuitry consist of a power electronic switching device (which may, e.g., comprise a MOSFET, IGBT, etc.) that is operated via a gate signal. The gate signal is generated from a control system (e.g. controller 30 shown in FIG. 2), which controller determines when the pulse current interrupt is to be delivered to the system.

Capacitor bank 222—A capacitor bank may be used to store the energy that is required for the pulse current. The capacitor bank consists of numerous capacitor in series and parallel, this enable the capacitor bank to be size appropriately for the application, series connection offer higher voltage ratings, parallel connections offer higher current capability of the capacitor bank.

Charging circuit 223—The charging circuitry charges the capacitor bank. The charging circuitry comprises a power electronic switching device (e.g., a MOSFET, IGBT, etc.) that is operated via a gate signal. The gate signal is controller via a suitable controller (e.g. microcontroller with auxiliary circuitry). A limiting device (resistor, R) is connected in series with the power electronic switch to limit the inrush current the capacitor bank the power electronic switch will be exposed to.

Of course the power generating circuitry 22 is not limited to the arrangement shown in FIG. 3 and may comprise any other suitable circuits/circuitry as desired. Equally any of the components shown in FIG. 3 may be modified or omitted.

Although it would be possible to fully discharge the capacitor bank 222 in FIG. 3 to generate the pulse current, in embodiments, the pulse generating circuitry 22 is operable to control the size of the generated pulse current, e.g. based on the size of current measured by the current sensor 14, to substantially match the size of the generated pulse current with the current flowing in the transmission line. In this way can controllably temporarily reduce current in transmission line to sufficient level to activate semiconductor device whilst ensuring that the generated pulse is tailored based on the required reduction (e.g. to avoid generating too large a pulse, if not necessary, which could itself cause problems).

Figure 4:
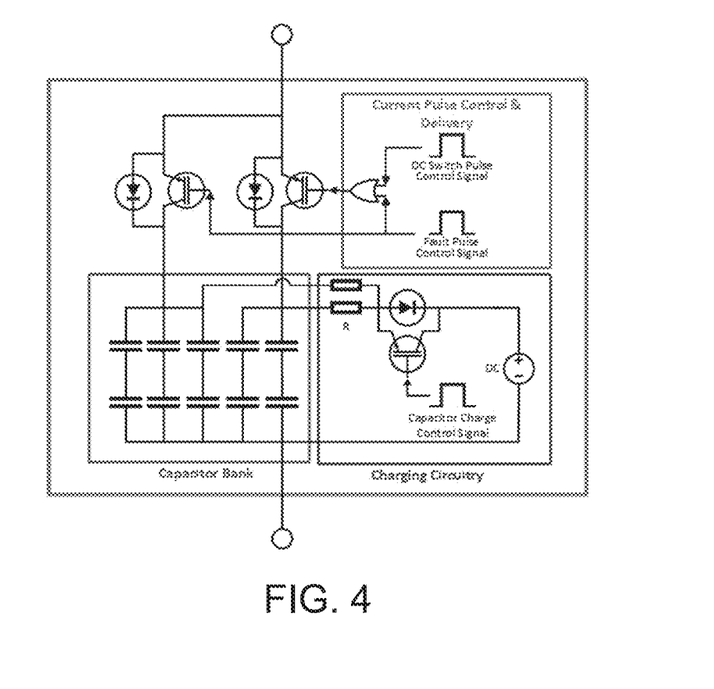
FIG. 4 shows another example of a pulse injection circuit that may be used within a DC circuit breaker arrangement according to the present disclosure.

FIG. 4 shows another example of suitable pulse injection circuitry 22 that could be used for the present disclosure. In this system the capacitor bank is split into two banks, and each capacitor bank has its own pulse delivery circuitry. The principle behind splitting the capacitor bank is that during a fault the pulse current required to break the circuit will be significantly higher that the pulse current required to break the circuit in normal operation. When the circuit is required to operate in normal conditions (no fault current on the transmission line) one of the capacitor banks is discharged, when the circuit is required to operate under a fault current conditions both the capacitor banks are discharged. The arrangement of FIG. 4 can therefore control the size of the generated pulse current by selectively discharging some or all of the capacitor banks. Of course, this can be extended to include additional capacitor banks for a more refined control.

However, other arrangements for controlling the size of the generated pulse current would of course be possible.

Inductive Coupling (Transformer)

The pulse injection circuit further comprises an inductive coupler (e.g. a transformer), through which the generated pulse is injected. In embodiments, the inductive coupling, or pulse transformer, comprises two magnetically coupled windings. The second winding 24 is connected to the pulse generating circuitry 22 whereas the first winding 26 is connected in series with the transmission line 2. The transformer may also comprise a magnetic core for coupling the first and second windings.

The first winding 26 of the transformer may be significant in current rating due to the requirement to conduct the DC full power during normal operation. The second winding 24 connected to the pulse generating circuitry 22 may be relatively smaller since it is only required to handle only the generated pulse current. The turns ratio of this transformer will enable the use of power electronic devices for the pulse current generation circuitry of convenient voltage and current ratings. Due to the short duration of the pulse current used during the current interruption the size of the magnetic core is kept under reasonable limits.

Other suitable arrangements for inductively coupling the pulse generating circuitry with the DC transmission line may also be used.

Although the pulse generating circuitry is substantially isolated from the transmission line during normal operation, transient voltages on the transmission line may be coupled into the pulse interrupt circuit. The effect of these transient voltage can however be limited by appropriate selection of the turns ratio of the transformer. Additionally/alternatively, suitable bypass circuitry may be provided for the second winding 24 to transient voltage pickup during normal operation.

Overvoltage Suppression Circuit (Snubber)—28

In order to avoid overvoltage on terminal of the inductive coupler a snubber circuit 28 is provided across the terminals of the first winding 26 of the transformer. The snubber circuit 28 acts to limit over voltages produced by the sudden current change in the transformer when the pulse current is injected and the charge/discharge of the parasitic capacitances on its terminals. Thus, when the pulse current is generated and the semiconductor switching device 12 switches off, the residual energy can be dissipated via the snubber circuit 28.

In the embodiment shown in FIG. 1, the snubber circuit 28 comprises a diode connected in parallel across the first winding 26 of the transformer and a parallel capacitor-resistor pair. However, other suitable snubber circuit arrangements may be used.

Figure 5:
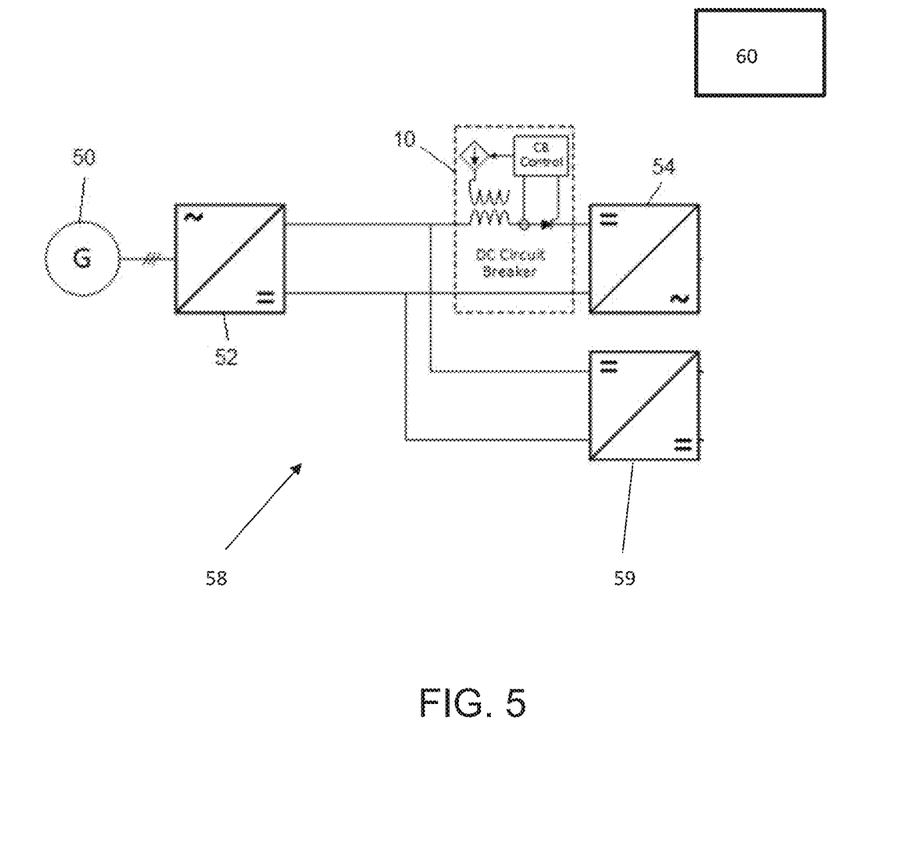
FIG. 5 shows an electrical distribution system including a DC circuit breaker arrangement according to the present disclosure.

The circuit breaker arrangement described above can thus be provided, or installed within, an electrical distribution system. FIG. 5 shows how the DC circuit breaker can be integrate at a system level within an electrical distribution system 58. In FIG. 5, the circuit breaker arrangement 10 is connected in series with the transmission line 2 between an appropriate DC power source which in FIG. 5 includes a generator 50 and AC-to-DC converter 52. In FIG. 5 the circuit breaker arrangement 10 is connected between the AC-to-DC converter 52 and a corresponding DC-to-AC converter 54 providing power to a motor 56. As shown in FIG. 5, the electrical distribution system 58 may also deliver a second DC load to other components within the electrical network. For example, in an aircraft electrical distribution system a DC load may be delivered to other on board power systems such as seat power, auxiliary power for control systems, or any other such systems that require DC power from the main DC bus of the aircraft. A DC/DC converter 59 is provided to convert the DC bus voltage to the appropriate value based on the DC load characteristics.

An overall system level controller 60 is also provided that controls the overall operation of the electrical distribution system.

However, the circuit breaker arrangement 10 may of course find utility in a range of applications. For instance, the connection in series will enable the proposed circuit breaker arrangement 10 to be utilized in an analogous manner to traditional mechanical switches, e.g. under the control of the system level controller 60 for power distribution, load fault isolation, load isolation, etc. Thus, whilst embodiments have been described above in relation to interrupting the current in response to detecting an overcurrent in the transmission line, it is also possible to use the circuit breaker arrangement to interrupt the current for other reasons, and suitable control signals may be provided to do this.

The present disclosure may thus provide a solid-state DC circuit breaker arrangement with various benefits.

For instance, by reducing the interruption current by means of the inductive coupler the current interruption can be done in an easily and the rating of the semiconductor device is considerably lower than in the case of a device rated for full current interruption. In addition the current reduction mechanism allows for the use of a bipolar device, such as SCR or GTO based devices, which may be of higher voltage and current rating than other types of device switch current interruption capability like IGBT or MOSFET. For example, currently SCR (or GTO) voltage and current ratings far exceed those of MOSFETs and IGBTs, and so the circuit breaker arrangement described above could be readily developed using current generation SCR (or GTO) based devices without the need for series connections to combat the voltage requirements or parallel connections to combat the fault current requirements, and the balancing circuits that such arrangements usually require.

Furthermore, the magnetic coupler has to be sized and rated for a fraction of the circuit current, therefore allowing for a more compact design.

The circuit breaker arrangement according to the present disclosure may thus save significant weight on the electrical distribution system. The weight saving is not only from replacement of electro-mechanical circuit breakers/electronic circuit breakers (multiple devices in series/parallel) but also from the ability to significantly increase the DC circuit voltage within the aircraft.

Compared to some more traditional approaches, the circuit breaker arrangement according to the present disclosure is thus able to effectively interrupt a DC current, whilst also, in embodiments:

being relatively more compact and lightweight;
reducing arcing and mechanical parts wear out;
achieving faster current interruption (and thus reducing fault propagation); and
reducing stresses on circuit connected components.

Whilst the circuit breaker component may find particular utility in aircraft electrical distribution systems, e.g. as described above, it will be appreciated that the technology described herein is not limited to aircraft systems, and the circuit breaker component may be used in any electrical system.

It will also be appreciated that the circuit breaker arrangement according to the present disclosure may include other components than those described above, or that some of these components may optionally be omitted.

Thus, although the techniques presented herein have been described with reference to particular embodiments, it will be understood by those skilled in the art that various changes in form and detail may be made without departing from the scope of the invention as set forth in the accompanying claims.

What is claimed is:

1. A circuit breaker arrangement for interrupting a current flowing through a direct current (DC) transmission line, the circuit breaker arrangement comprising:
   a semiconductor switching device arranged to turn-off to interrupt the current flowing through the transmission line when the current in the transmission line falls below a threshold value determined by the semiconductor switching device;
   a pulse injection circuit including pulse generating circuitry operable to generate a pulse current and an inductive coupling between the pulse generating circuitry and the transmission line arranged to inductively inject pulse currents generated by the pulse generating circuitry into the transmission line;
   a current sensor for monitoring the current in the transmission line; and
   a control circuit that is configured to, in response to a signal to interrupt current flowing through the transmission line:
   cause the pulse injection circuit to inductively inject into the transmission line a pulse current that opposes the current flowing through the transmission line to thereby reduce the current in the transmission line below the threshold value determined by the semiconductor switching device to cause the semiconductor switching device to turn-off to interrupt the path for the current flow through the transmission line.

2. The circuit breaker arrangement of claim 1, wherein the inductive coupling comprises a transformer having a second winding connected to the pulse generating circuitry and a first winding connected to the DC transmission line.

3. The circuit breaker arrangement of claim 2, wherein the second winding includes a greater number of turns than the first winding.

4. An electrical distribution system including a direct current (DC) power supply and a DC transmission line for distributing power from the DC power supply to one or more electrical and/or electronic components, wherein the DC transmission line includes a circuit breaker arrangement as claimed in claim 1.

5. The electrical distribution system of claim 4, wherein the signal to interrupt current through the transmission line is provided to the control circuit by an overall controller for the electrical distribution system.

6. The circuit breaker arrangement of claim 1, wherein when it is desired to interrupt the current flowing through the DC transmission line, the control circuit is configured to control the pulse generating circuitry to generate a pulse current having a magnitude determined based on the size of the current monitored by the current sensor.

7. The circuit breaker arrangement of claim 1, wherein the pulse generating circuitry comprises one or more charge storage devices, and wherein the size of the pulse current is controlled by selectively discharging the one or more charge storage devices.

8. The circuit breaker arrangement of claim 1, wherein the semiconductor switching device comprises a bipolar transistor such as a gate turn-off transistor, or a silicon-controlled rectifier.

9. The circuit breaker arrangement of claim 1, wherein the current sensor comprises a Hall effect sensor.

10. The circuit breaker arrangement of claim 1, comprising a snubber circuit for reducing overvoltage when the pulse current is injected.

11. The circuit breaker arrangement of claim 1, wherein the signal to interrupt current through the transmission line is provided to the control circuit in response to the current sensor detecting an overcurrent.

12. A method of interrupting a current flowing through a direct current (DC) transmission line using a circuit breaker arrangement as claimed in claim 1, the method comprising:
   when it is desired to interrupt the current flowing through the DC transmission line: the control circuit controlling the pulse injection circuit to inject a pulse current into the DC transmission line opposing the current flowing through the DC transmission line to thereby reduce the current in the DC transmission line below the threshold value determined by the semiconductor switching device such that the semiconductor switching device interrupts the current flowing through the DC transmission line.

* * * * *